UNITED STATES PATENT OFFICE.

EDWIN J. HOUSER, OF FORT VALLEY, GEORGIA.

FERTILIZING COMPOUND.

SPECIFICATION forming part of Letters Patent No. 251,364, dated December 27, 1881.

Application filed April 13, 1881. (Specimens.)

*To all whom it may concern:*

Be it known that I, EDWIN JOHN HOUSER, a citizen of the United States, residing at Fort Valley, in the county of Houston, State of Georgia, have invented a new and useful Composition of Matter, to be known as "Cotton-Seed-Meal Fertilizer," to be used for fertilizing the soil for the better production of corn, cotton, tobacco, grain, &c., and to build up the soil for increased productiveness, of which the following is a specification.

My composition consists of the following ingredients, combined in the proportion stated, viz: cotton-seed meal, eight hundred pounds; dissolved bone, six hundred pounds; German potash salts, six hundred pounds, making two thousand pounds, or one ton, or to be combined in the same proportion in smaller quantities. The cotton-seed meal is made from the common cotton-seed ground fine in a mill. These ingredients are to be thoroughly mixed by hand, and then ground together through a mill made for the purpose.

In using the above-named composition the soil is prepared just as it is to apply any other commercial fertilizer, applying from fifty to two hundred pounds to the acre, with a flue made of tin for the purpose, or with a common cotton-seed planter.

By the use of this fertilizer the farmer gets an article all of which is valuable in building up the soil and fertilizing plants, the bulk or body of the fertilizer being cotton-seed meal, which in itself is a good fertilizer, and not undetermined matter, as is found in other commercial fertilizers.

I am aware that these ingredients have been used in fertilizers heretofore, but not in combination with cotton-seed meal.

What I claim, and desire to secure by Letters Patent of the United States, is—

The herein-described composition of matter to be used as a fertilizer, consisting of cotton-seed meal, dissolved bone, and German potash salts, in the proportions specified.

EDWIN JOHN HOUSER.

Witnesses:
MARMADUKE G. BAYNE,
MILTON L. COOPER.